(12) United States Patent
Lim et al.

(10) Patent No.: US 10,997,226 B2
(45) Date of Patent: May 4, 2021

(54) CRAFTING A RESPONSE BASED ON SENTIMENT IDENTIFICATION

(71) Applicant: MICROSOFT TECHNOLOGY LICENSING, LLC, Redmond, WA (US)

(72) Inventors: Melissa Nicole Lim, Seattle, WA (US); Margaret Ann Mitchell, Seattle, WA (US); Piali Choudhury, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 743 days.

(21) Appl. No.: 14/719,173

(22) Filed: May 21, 2015

(65) Prior Publication Data

US 2016/0342683 A1 Nov. 24, 2016

(51) Int. Cl.
| | | |
|---|---|---|
| G06F 16/35 | (2019.01) | |
| G06F 16/335 | (2019.01) | |
| G06F 16/332 | (2019.01) | |
| G06F 40/289 | (2020.01) | |
| G06N 5/02 | (2006.01) | |

(52) U.S. Cl.
CPC ........ *G06F 16/337* (2019.01); *G06F 16/3329* (2019.01); *G06F 16/35* (2019.01); *G06F 40/289* (2020.01); *G06N 5/025* (2013.01)

(58) Field of Classification Search
CPC .............................. G06F 16/35; G06F 16/3329
See application file for complete search history.

(56) References Cited

U.S. PATENT DOCUMENTS

| | | |
|---|---|---|
| 5,860,064 A | 1/1999 | Henton |
| 6,212,502 B1 | 4/2001 | Ball et al. |
| 6,275,806 B1 | 8/2001 | Pertrushin |
| 6,731,307 B1 | 5/2004 | Strubbe et al. |
| 7,490,042 B2 | 2/2009 | Eide et al. |
| 7,539,618 B2 | 5/2009 | Yoshida |
| 7,908,554 B1 | 3/2011 | Blattner |
| 7,930,302 B2 * | 4/2011 | Bandaru ................. G06F 40/30 707/737 |

(Continued)

FOREIGN PATENT DOCUMENTS

| | | |
|---|---|---|
| CN | 102076387 A | 5/2011 |
| CN | 103679462 A | 3/2014 |

(Continued)

OTHER PUBLICATIONS

"International Search Report and Written Opinion Issued in PCT Application No. PCT/US2016/028025", dated Jul. 14, 2016, 10 Pages.

(Continued)

*Primary Examiner* — Eliyah S. Harper (57) ABSTRACT

Examples described herein provide a digital assistant crafting a response based on target sentiment identification from user input. The digital assistant receives unstructured data input and identifies a segment of the input that includes a facet item. A sentiment associated with the facet item in the segment is identified and classified to identify a targeted sentiment directed towards the facet item. A response is generated based on the targeted sentiment and the facet item.

20 Claims, 6 Drawing Sheets

(56) References Cited

U.S. PATENT DOCUMENTS

| | | | |
|---|---|---|---|
| 7,944,448 B2 | 5/2011 | Iwamura et al. | |
| 8,204,747 B2 | 6/2012 | Kato et al. | |
| 8,214,214 B2 | 7/2012 | Bennett | |
| 8,494,982 B2 | 7/2013 | Jung et al. | |
| 8,725,513 B2 | 5/2014 | Cross et al. | |
| 8,751,427 B1 | 6/2014 | Mysen et al. | |
| 8,782,061 B2 * | 7/2014 | Agrawal | G06F 40/295 707/755 |
| 9,251,182 B2 * | 2/2016 | Deshpande | G06F 16/215 |
| 9,477,749 B2 * | 10/2016 | Mathew | G06F 40/20 |
| 2003/0167167 A1 | 9/2003 | Gong | |
| 2008/0096533 A1 * | 4/2008 | Manfredi | G06N 3/006 455/412.1 |
| 2009/0265332 A1 * | 10/2009 | Mushtaq | G06F 17/30 |
| 2010/0049590 A1 * | 2/2010 | Anshul | G06Q 30/02 705/7.32 |
| 2010/0332287 A1 * | 12/2010 | Gates | G06Q 30/0203 705/7.32 |
| 2012/0158726 A1 * | 6/2012 | Musgrove | G06F 16/353 707/737 |
| 2013/0159277 A1 * | 6/2013 | Liu | G06F 40/211 707/709 |
| 2013/0173269 A1 | 7/2013 | Adler et al. | |
| 2013/0238531 A1 * | 9/2013 | Seidler | G06F 16/367 706/12 |
| 2014/0108308 A1 * | 4/2014 | Stout | G06N 20/00 706/12 |
| 2014/0172415 A1 | 6/2014 | Jo | |
| 2015/0089409 A1 * | 3/2015 | Asseily | G06Q 50/01 715/765 |
| 2015/0149461 A1 * | 5/2015 | Aguilar Lemarroy | G06F 16/35 707/737 |
| 2015/0154264 A1 * | 6/2015 | Lightner | G06F 16/2468 707/780 |
| 2015/0254230 A1 * | 9/2015 | Papadopoullos | G06F 16/31 704/8 |

FOREIGN PATENT DOCUMENTS

| | | |
|---|---|---|
| CN | 103778555 A | 5/2014 |
| CN | 104346326 A | 2/2015 |
| WO | 2014112024 A1 | 7/2014 |

OTHER PUBLICATIONS

"First Office Action and Search Report Issued in Chinese Patent Application No. 201680028277.2", dated Sep. 18, 2020, 15 Pages. (W/O English Translation).

"Summon to Attend Oral Proceedings Issued in European Patent Application No. 16720257.1", Mailed Date: Oct. 24, 2019, 7 Pages.

"Memotion (Emotion Analysis)", Retrieved on: Jan. 20, 2015; 2 pages. Available at: https://play.google.com/store/apps/details?id=com.brandall.memotion&hl=en.

Ang, et al., "Prosody-Based Automatic Detection of Annoyance and Frustration in Human-Computer Dialog", In Proceedings of 7th International Conference on Spoken Language Processing, Sep. 16, 2002, 4 pages.

Feidakis, et al., "A Dual-Modal System that Evaluates User's Emotions in Virtual Learning Environments and Responds Affectively", In Proceedings of Journal of Universal Computer Science, vol. 19, Issue 11, Retrieved on: Jan. 20, 2015, 23 pages.

"Office Action Issued in European Patent Application No. 16720257.1", dated Jan. 3, 2019, 6 Pages.

* cited by examiner

CRAFTING A RESPONSE BASED ON SENTIMENT IDENTIFICATION

CROSS-REFERENCE TO RELATED APPLICATIONS

The present application is related to co-pending U.S. patent applications entitled "Facet Recommendations From Sentiment-Bearing Content" (Ser. No. 14/475,4570), and "Crafting Feedback Dialogue With a Digital Assistant" (Ser. No. 14/718,071), each assigned to the assignee of the present application.

BACKGROUND

Intelligent agent systems may generate recommendations or respond to questions using information from a variety of databases or models. Some intelligent agent systems may also access stored user profile information to draw upon when generating recommendations or responses.

SUMMARY

Examples of the disclosure are generally directed to a system and method for crafting a response based on sentiment identification. User input may be received and a segment of the user input that includes a specific instance of an item may be identified. A sentiment in the segment may be identified based on at least one content feature of the user input. The identified sentiment may be used to identify a sentiment directed towards the specific instance of an item, and a response may be generated based on the sentiment and the item.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure enable an intelligent agent or digital assistant to generate personalized responses based on sentiment identification within user input. In some examples, the intelligent agent or digital assistant identifies sentiment directed towards, or targeted at, a particular instance or type of item in the user input and uses the identified sentiment to craft a personalized response to address the sentiment expressed. In some other examples, the intelligent agent or digital assistant updates user preferences and automatically personalizes a user profile based on identified sentiment in user input.

Aspects of the disclosure further provide increased user interaction performance by providing empathetic or personalized responses to user input in the form of conversational utterances that address sentiment expressed in the user input. The resulting efficiency improvements in user interactions saves the user time by reducing or eliminating the need for the user to manually update personal preferences or opinions associated with certain items or entities in a user profile, refining the personalization of the user preferences used by the intelligent agent during user interactions, and providing more accurate recommendation capabilities for the intelligent agent using the continually improving personalized profile.

Figure 1:
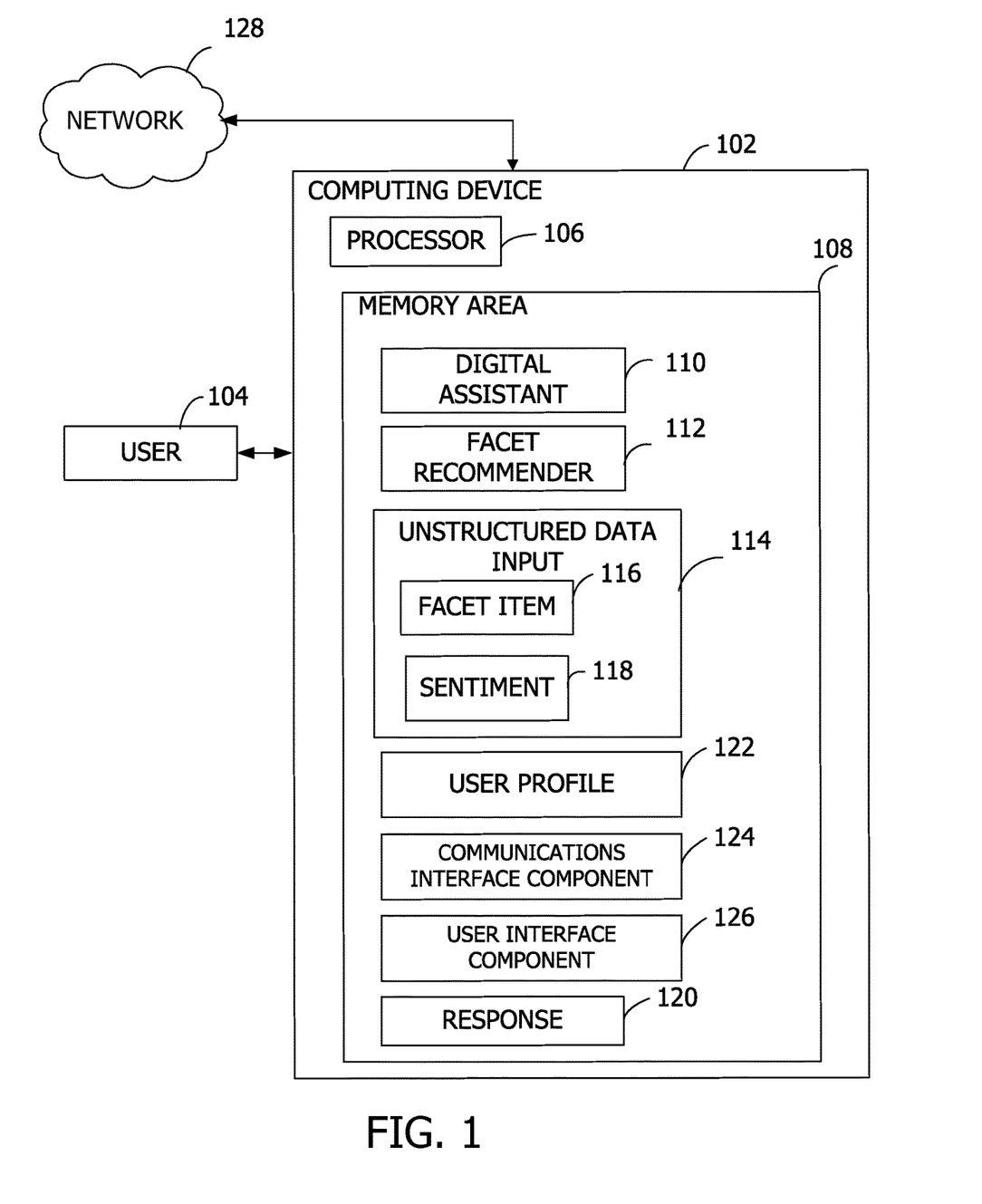
FIG. 1 is an exemplary block diagram illustrating a computing device for crafting a response based on sentiment identification.

Referring again to FIG. 1, an exemplary block diagram illustrates a computing device for crafting responses based on sentiment identification. In the example of FIG. 1, the computing device associated with a user represents a system for receiving unstructured data input and identifying items and associated sentiment within the unstructured data input. Unstructured data refers to natural language data, such as textual or spoken user input, for example. In some examples, unstructured data, or natural language data, may be obtained from the Internet or a user computing device. For example, unstructured data may be obtained by scraping or mining social media networks or services. As another example, user input associated with social media or messaging applications is typically unstructured data. Unstructured data may contain text, numbers, dates, symbols, non-alphanumeric characters, sounds, or any combination of the foregoing.

Unstructured data may include writing-based structure, such as paragraph or sentence structure, temporal structure, such as a point in time associated with the creation of the data, or application-based structure, such as a ranking or metric associated with the data. For example, a social media-based review service may include textual reviews of various companies or services, such as eating establishments in one example. The review service may have an application-based structure, such as a number of stars associated with a metric for ranking how the reviewer felt about a service of product associated with the company or service being reviewed. The unstructured data in this example may include the natural language textual input of the reviewer as well as the number of stars, or metric, that indicates a degree of positive or negative feedback associated with the review.

The computing device represents any device executing instructions (e.g., as application programs, operating system functionality, or both) to implement the operations and functionality associated with the computing device. The computing device may include a mobile computing device or any other portable device. In some examples, the mobile computing device includes a mobile telephone, laptop, tablet, computing pad, netbook, gaming device, and/or portable media player. The computing device may also include less portable devices such as desktop personal computers, kiosks, tabletop devices, industrial control devices, wireless charging stations, and electric automobile charging stations. Additionally, the computing device may represent a group of processing units or other computing devices.

In some examples, the computing device has at least one processor, a memory area, and at least one user interface. The processor includes any quantity of processing units, and is programmed to execute computer-executable instructions for implementing aspects of the disclosure. The instructions may be performed by the processor or by multiple processors within the computing device, or performed by a processor external to the computing device. In some examples, the processor is programmed to execute instructions such as those illustrated in the figures (e.g., FIG. 3-4).

In some examples, the processor represents an implementation of analog techniques to perform the operations described herein. For example, the operations may be performed by an analog computing device and/or a digital computing device.

Figure 2:
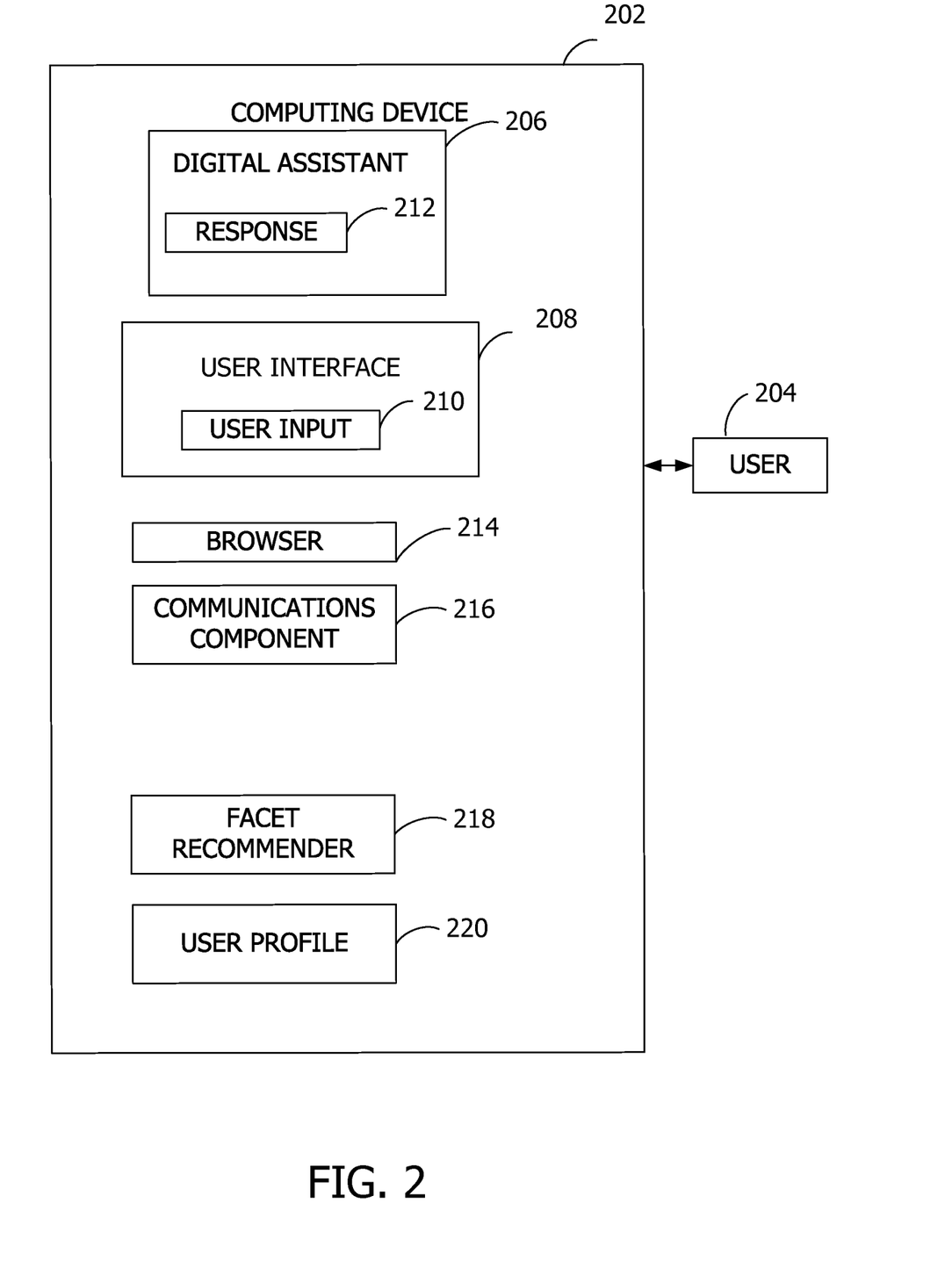
FIG. 2 is an exemplary block diagram illustrating a computing device for crafting a response based on sentiment identification.

The computing device further has one or more computer readable media such as the memory area. The memory area includes any quantity of media associated with or accessible by the computing device. The memory area may be internal to the computing device (as shown in FIG. 1-2), external to the computing device (not shown), or both (not shown). In some examples, the memory area includes read-only memory or memory wired into an analog computing device, or both.

The memory area stores, among other data, one or more applications. The applications, when executed by the processor, operate to perform functionality on the computing device. Exemplary applications include mail application programs, web browsers, calendar application programs, address book application programs, messaging programs, media applications, location-based services, search programs, and the like. The applications may communicate with counterpart applications or services such as web services accessible via a network. For example, the applications may represent downloaded client-side applications that correspond to server-side services executing in a cloud.

The memory area further stores activity logs associated with user activity and/or computing device activity associated with a user. The memory area may further store error logs associated with the computing device and/or user activity corresponding to the computing device. For example, an activity log may store a message that a user sends via a messaging application implemented on the computing device, along with a time stamp for the message, the message type, and details about the device input. In this illustrative example, an activity log entry may include the following:
Time: 6:00 PM;
Type: TextMessage;
InputType: PhoneKeyboard;
KeyboadLanguage: English;
Text: "See you soon?"
This illustrative activity log entry may be used by a digital assistant to learn what type of words a user prefers to use in what kinds of contexts. This type of learning may further allow the digital assistant to user similar vocabulary in similar contexts when speaking to the user, in order to speak like the user. In other examples, audio samples may be stored (e.g. a user-created reminder using voice commands, a spoken query, etc. . . . ) along with a time stamp, type, and other associated information corresponding to the user activity. For example, a user may attempt to create a calendar reminder using voice command prompts and fail to successfully generate the reminder. In this example, an error log entry may include an audio sample of the spoken query, the stage at which point the task failed, as well as other corresponding information about the failed activity.

The memory area further stores one or more computer-executable components. Exemplary components include a communications interface component, a user interface component, and a classifier component. The user interface component, when executed by the processor of the computing device, causes the processor to output data to the user interface component and process user input received via the user interface component.

In some examples, the communications interface component includes a network interface card and/or computer-executable instructions (e.g., a driver) for operating the network interface card. Communication between the computing device and other devices may occur using any protocol or mechanism over any wired or wireless connection. In some examples, the communications interface is operable with short range communication technologies such as by using near-field communication (NFC) tags.

In some examples, the user interface component includes a graphics card for displaying data to the user and receiving data from the user. The user interface component may also include computer-executable instructions (e.g., a driver) for operating the graphics card. Further, the user interface component may include a display (e.g., a touch screen display or natural user interface) and/or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way.

Referring again to FIG. 1, an exemplary block diagram illustrates a computing device crafting a response based on sentiment identification. Computing device 102 may be associated with user 104. Computing device 102 may include processor 106 communicatively coupled to memory area 108. Memory area 108 includes digital assistant 110, which may be one implementation of an intelligent agent executed by processor 106 to provide personalized responses to user 104. Memory area 108 may also include facet recommender 112, which may create and present recommendations for facets of particular conversational topics, and optionally for entities associated with those facets, from sentiment-bearing content such as user input, consumer reviews, social media content (e.g., text or speech based content), or other opinion-bearing online content.

Memory area 108 may also include unstructured data input 114, which may be received from user 104 in some examples, or via social media or online content in other example. Unstructured data input 114 may include, without limitation, facet item 116 and/or sentiment 118. In some examples, unstructured data input 114 may include any number of facets, facet items, and/or sentiment expressions.

Note that in the context of some of the examples provided herein, the term "facet" is defined as referring to a general term or category (e.g. food, drink, event), and "facet item" is defined as referring to a specific instance of its facet (e.g. burger, margarita, concert) associated with particular conversational topics. A facet item may be received in user-written text, for example, and normalized or structured using the associated facet identified during analysis of the unstructured data. For example, with respect to a restaurant-based conversational topic, facets may include, but are not limited to, location, food, drinks, service, staff, atmosphere, ambience, amenities, entertainment, games, customers, events, price, wait times, freshness, etc. Each facet may also be further segmented into sub-facets. For example, a "food" facet may include sub-facets of beef, seafood, poultry, vegetarian, etc., each of which may also be individually treated as a facet. In these example, for the facet of "food," a facet item identified in conversation may be "burger," an instance of "food," which may additionally be associated with a sub-facet of "beef," for example.

Facet recommender 112 applies a machine-learned facet model to the sentiment-bearing content to identify conversational topic facets associated with spans or segments of that content. In various examples, Facet recommender 112 also optionally uses the facet model and/or a machine-learned sentiment model to determine any of neutral sentiment (also including cases where no sentiment is evident in the content), positive sentiment, or negative sentiment associated with conversational topics, facets, facet items, or corresponding entities. Facet recommender 112 may generate new conversational utterances (i.e., short neutral, positive or negative suggestions) about particular facets that may be based on the identified sentiments associated with those facets, and that are optionally based on determinations of a "consensus" for facets and/or sentiments. Further, in some examples, these utterances are created by fitting facets, associated spans or segments extracted from the sentiment-bearing content, and/or sentiments associated with particular conversational topics to one or more predefined conversational frameworks.

Digital assistant 110 may use facet recommender 112 to identify facet item 116 and sentiment 118 within unstructured data input 114. Facet recommender 112 may also be used by digital assistant 110 to identify a facet for facet item 116, where the facet may be a category, type, or entity, for example. If the input includes the phrase "I didn't like the burger," for example, facet recommender 112 may identify the facet item as "burger" and the facet for the facet item as "food." In another example, facet recommender 112 may identify further detail of a sub-facet "beef" of the facet "food" corresponding to the facet item "burger." As yet another example, user input may include the phrase "The concert was okay; the band was great but it was too hot." In this example, facet recommender 112 may identify the facet item as "concert" and the facet for the facet item as "event."

Digital assistant 110 may use the identified sentiment and facet item to generate response 120 for output to user 104. In this example, sentiment 118 is directed towards facet item 116, and may also be referred to as targeted sentiment. Targeted sentiment is sentiment that is identified as targeted towards a facet item, rather than a general emotion expressed by or detected from a user. The sentiment in this example phrase may be identified as negative, thus the targeted sentiment is negative sentiment directed towards the burger. In some examples, digital assistant 110 may also update user profile 122 using the facet item and the identified targeted sentiment from user input, such as sentiment 118 in this example. For example, digital assistant 110 may update user profile 122 to indicate that the user does not like burgers, or does not like burgers from a specific source separately identified in corresponding user input, in some examples. In other examples, such as the input phrase "The band was great but it was too hot," digital assistant 110 may identify "great" as sentiment targeted towards the band, and update user profile 122 to indicate that the user likes that particular band or style of music, for example.

Communications interface component 124 and user interface component 126 may also be incorporated into memory area 108. In some examples, processor 106 may execute digital assistant 110 to process unstructured data input 114 maintained in memory area 108. Digital assistant 110 may generate response 120 corresponding to unstructured data input 114 and output response 120 via user interface component 126. In some other examples, one of more components may be implemented remote from computing device 102 and accessible over network 128 via communications interface component 124.

The digital assistant 110 may use facet recommender 112 to identify targeted sentiment associated with one or more facet items of user input. A facet item may be an instance of a categorized entity or item in these examples. For example, the user input may include a phrase, such as "the sandwich was too greasy." The facet item of the exemplary portion of user input is "sandwich" and the targeted sentiment identified by classifier component may be negative sentiment directed towards the sandwich. Digital assistant 110 may also use the identified targeted sentiment in combination with other content of user input, such as lexical features, syntactic features, semantic features, linguistic features, non-linguistic features, and any other suitable features, to generate response 120. Lexical features may be features pertaining to words or vocabulary of a given language. Syntactic features may be features pertaining to the structure of a segment or sentence in a given language. Semantic features may be features pertaining to the meaning or relation between words, phrases, symbols, or signs used in a given language. Linguistic features may be features pertaining to a sound, symbol, or meaning corresponding to a given language, as well as expression of language, such as rate of speed associated with speech, a volume of sound associated with speech, prosody, or any other suitable characteristic of language expression. Non-linguistic features may be features such as when user input occurs (e.g. time of day), location where user input occurs, age of a user, gender of a user, information about a social network of a user, information about a family network of a user, and any other suitable information about a user providing the input, for example.

Digital assistant 110 may also use the identified targeted sentiment in combination with the other content of the user input to update user profile 122. In this way, digital assistant 110 is strengthening a personal connection with user 104 by identifying targeted sentiment and responding empathetically or in such a way as to address the identified targeted sentiment, and personalizing user profile 122 specific to the identified targeted sentiment.

Network 128 may enable computing device 102 to connect with and/or communicate with one or more services or other resources. Additionally, although the components of computing device 102 are depicted as implemented within computing device 102, one or more of these components may be implemented remote from computing device 102 and accessible via network 128.

FIG. 2 is an exemplary block diagram illustrating a computing device crafting a response based on targeted sentiment identification. Computing device 202 may be any device executing instructions (e.g., as application programs, operating system functionality, or both) to implement the operations and functionality associated with the computing device. The computing device may include a mobile computing device or any other portable device. In some examples, the mobile computing device includes a mobile telephone, laptop, tablet, computing pad, netbook, gaming device, wearable computing device, and/or portable media player. The computing device may also include less portable devices such as desktop personal computers, kiosks, tabletop devices, industrial control devices, wireless charging stations, and electric automobile charging stations. Additionally, the computing device may represent a group of processing units or other computing devices.

Computing device 202 may be associated with user 204. Computing device 202 may include digital assistant 206 and user interface 208. User 204 may interact with digital assistant 206 of computing device 202 via user interface 208. Digital assistant 206 may receive user input 210 via user interface 208, and process user input 210 to generate response 212 for output to user 204 via user interface 208, for example.

Computing device 202 may also include any number of other components and/or resources, including, without limitation, browser 214, communications component 216, facet recommender 218, and user profile 220.

In one example, digital assistant 206 may use facet recommender 218 to identify targeted sentiment within user input 210 and classify the identified targeted sentiment as positive, negative, or neutral (or no sentiment detected). Digital assistant 206 may use the identified targeted sentiment to generate response 212, specifically responding to the targeted sentiment of user input 210, for example.

Figure 3:
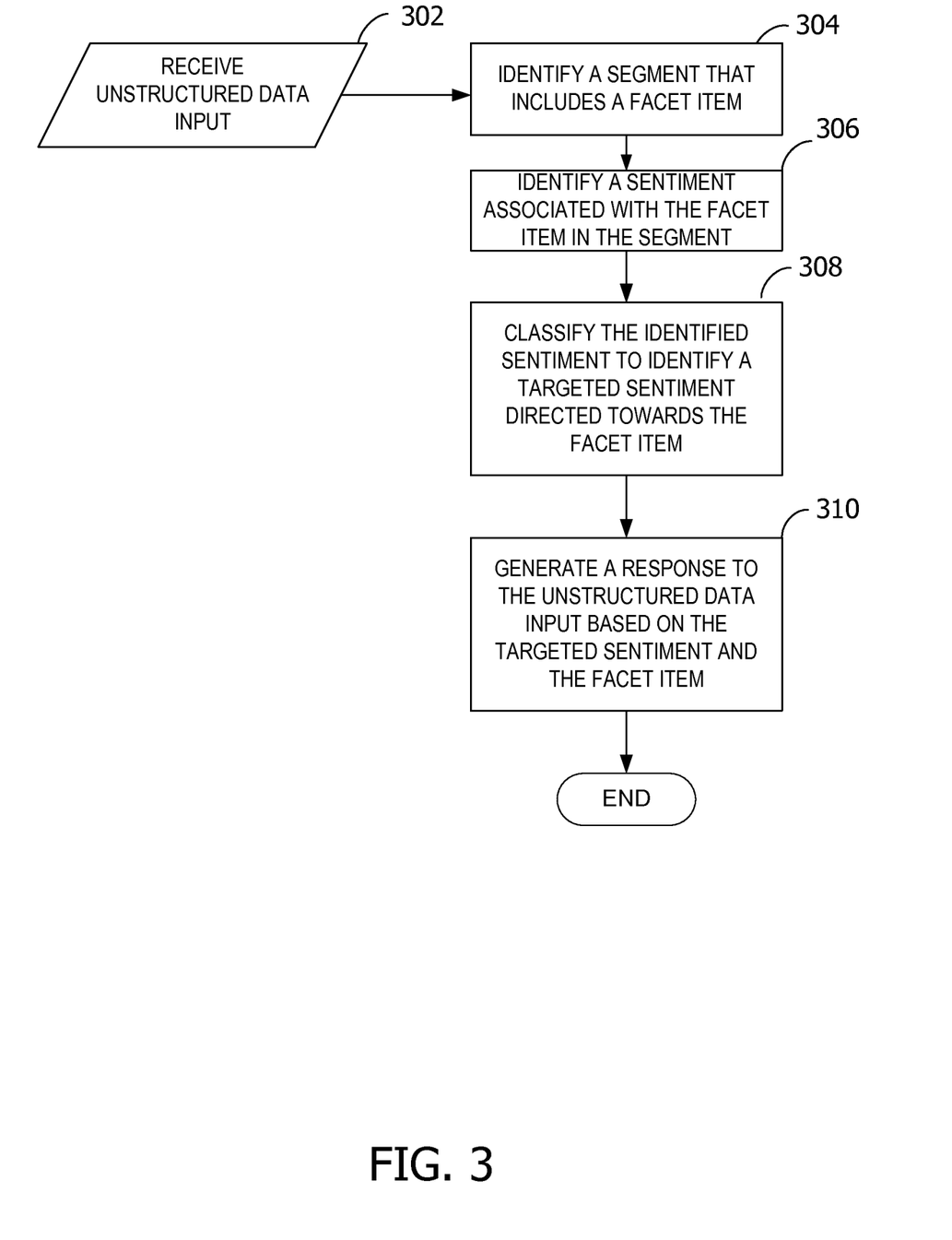
FIG. 3 is an exemplary flow chart illustrating operation of the computing device to generate a response based on sentiment identification.

FIG. 3 is an exemplary flow chart illustrating operation of the computing device to generate a response based on targeted sentiment identification. These operations may be performed by a digital assistant executed by a processing unit of a computing device, such as digital assistant 110 executed by processor 106 of computing device 102.

The process begins by receiving unstructured data input (at 302). The unstructured data input may be received in real-time, such as from a user interacting with the personal digital assistant implemented on a user device, in one example. The unstructured data input may also be obtained from social media and used to train a model to identify targeted sentiment, or train a digital assistant in targeted sentiment identification, in some examples.

The process identifies a segment of the unstructured data input that includes a facet item (at 304). The process identifies a sentiment associated with the facet item in the segment (at 306). In some examples, a digital assistant may use a facet recommender to identify targeted sentiment directed towards the face item in the segment.

The process classifies the identified sentiment to identify a targeted sentiment directed towards the facet item (at 308). The targeted sentiment may be, for example, either positive, negative, or neutral, where neutral could refer to neutral sentiment (e.g. the food was "okay") or a lack of sentiment identified within a segment. The process generates a response to the unstructured data input based on the targeted sentiment and the facet item (at 310), with the process terminating thereafter.

Figure 4:
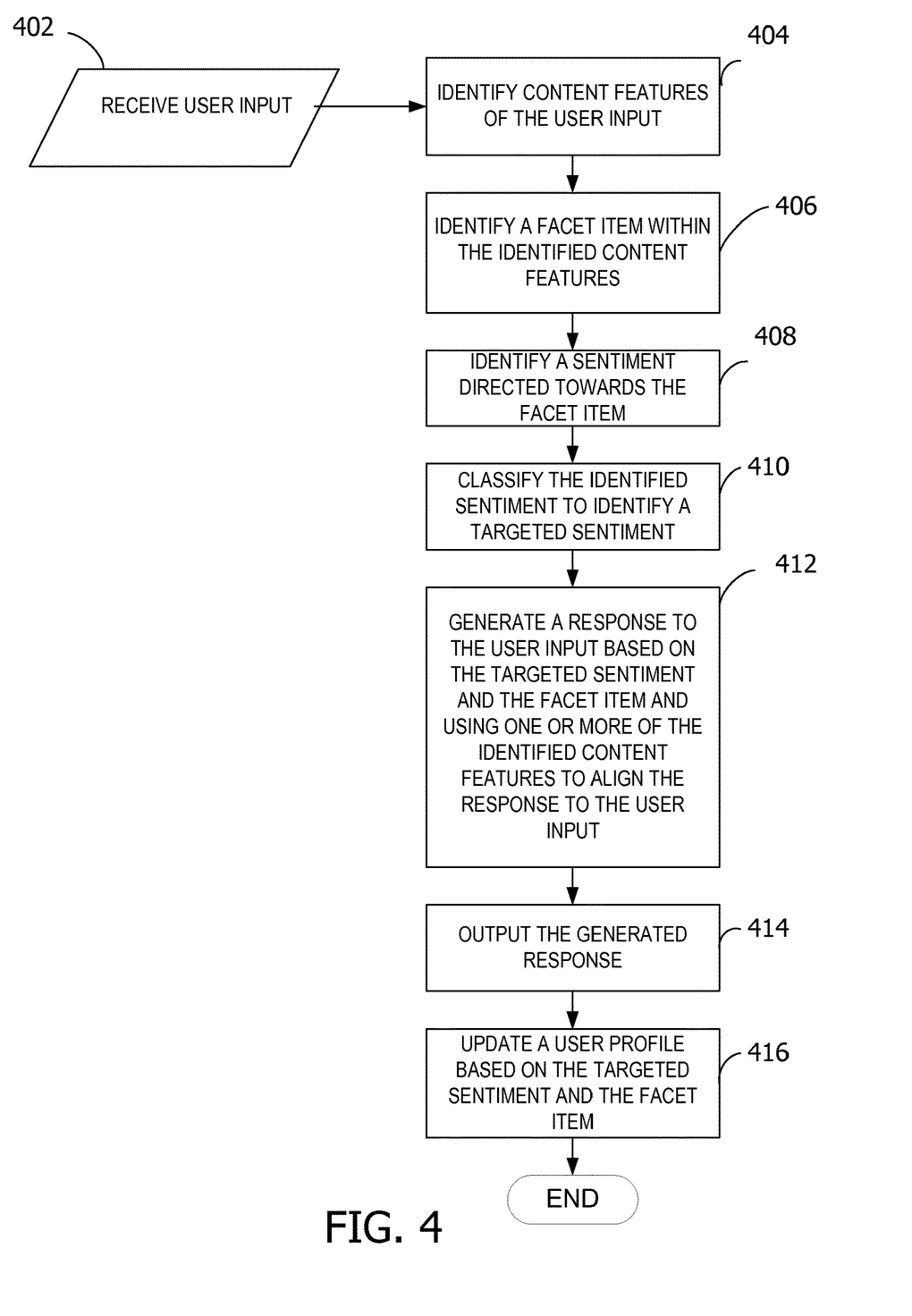
FIG. 4 is an exemplary flow chart illustrating operation of the computing device to craft a response and personalize a user profile based on sentiment identification.

FIG. 4 is an exemplary flow chart illustrating operation of the computing device to craft a response and personalize a user profile based on targeted sentiment identification. These operations may be performed by a digital assistant executed by a processing unit of a mobile device, such as digital assistant 206 executed by computing device 202, for example.

The process begins by receiving user input (at 402). The user input received may be in response to a question generated by the digital assistant to elicit feedback, in one example. In other examples, the user input received may be in response to a recommendation provided by a digital assistant of the mobile device.

The process identifies content features of the user input (at 404), which may include, without limitation, linguistic features, lexical features, syntactic features, semantic features, non-linguistic features, and any other suitable feature of user input. The process identifies a facet item within the identified content features (at 406). The process identifies a sentiment directed towards the facet item (at 408). The process may use a facet recommender, for example, to identify the facet item and the sentiment directed towards the facet item within the user input.

The process classifies the identified sentiment to identify a targeted sentiment (at 410) directed towards the facet item identified in the user input received. The process generates a response to the user input based on the targeted sentiment and the facet item and using one or more of the identified content features to align the response to the user input (at 412). For example, one identified content feature may be a rate of speed associated with speech corresponding to the user input received. This rate of speed may be mirrored by the digital assistant generating the response to the user input to align the response to the user's style or cadence of speech, for example.

The process outputs the generated response (at 414) and updates a user profile based on the targeted sentiment and the facet item (at 416), with the process terminating thereafter. For example, using the illustrative example of identifying a rate of speed associated with speech input by the user, the process may update a user profile with a reference of the user's speech pattern, such as rate of speech in this example. In another illustrative example, where targeted sentiment directed towards a facet item in the user input is identified as negative sentiment directed towards a particular eating establishment, the process may update the user profile to indicate that the user does not like that particular restaurant or style of food, based on the user input, the facet item identified in that input, and the targeted sentiment directed towards the facet item in that input.

Figure 5:
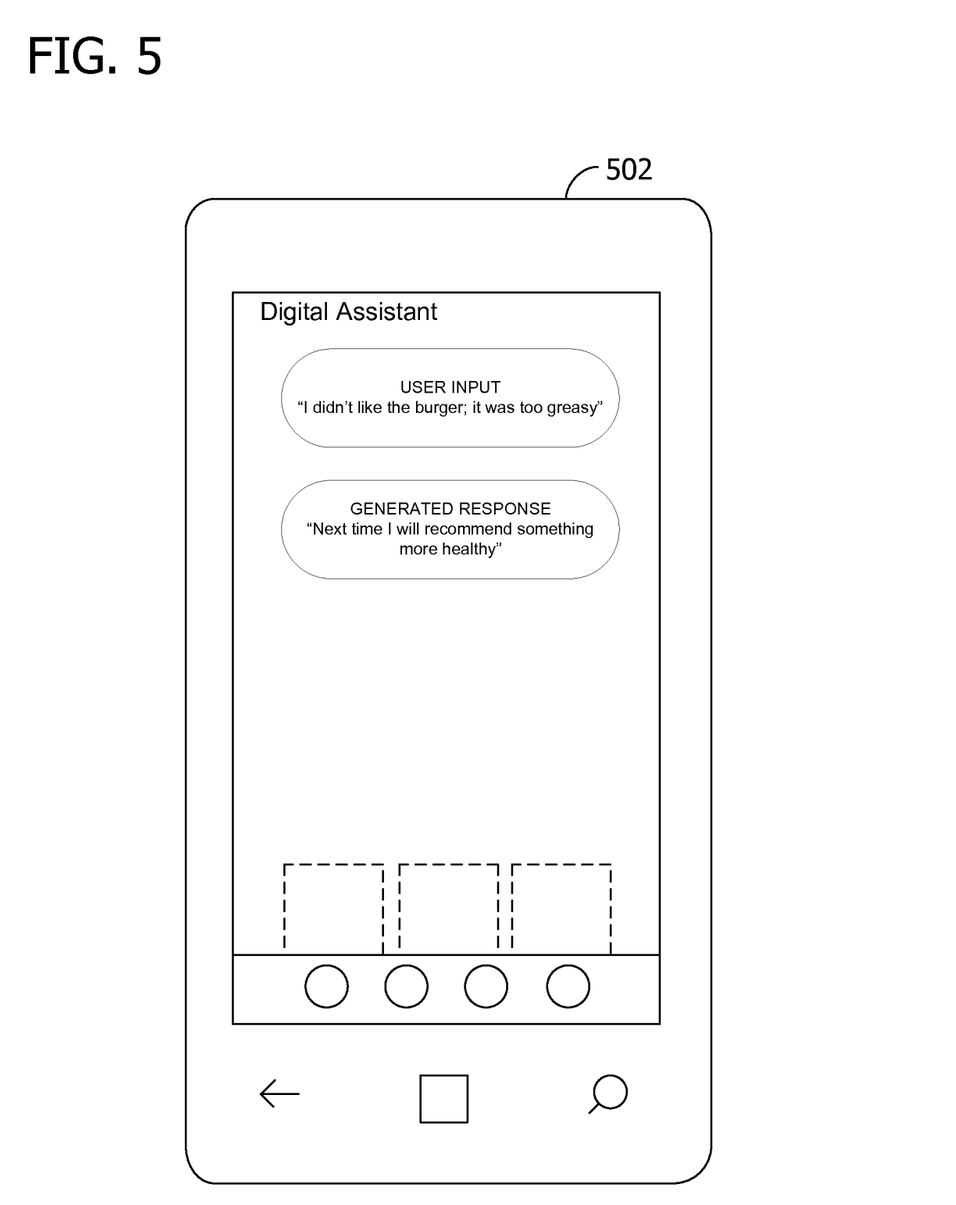
FIG. 5 is an exemplary block diagram illustrating a mobile device implementing the personalized digital assistant.

Referring to FIG. 5, an exemplary block diagram illustrating a mobile device implementing the personalized digital assistant is depicted. Mobile device 502 may be any mobile computing device, including, without limitation, a mobile phone, personal digital assistant (PDA), tablet, laptop, wearable computing device, or any other suitable mobile device. In one example, mobile device 502 is an illustrative example of computing device 202 in FIG. 2.

Mobile device 502 provides an exemplary operation of a digital assistant receiving unstructured data, such as user input, identifying a facet item and targeted sentiment within the unstructured data, and using the identified facet item and targeted sentiment to craft a response to the input. In this depicted example, the digital assistant receives unstructured data in the form of user input, possibly through a natural language conversation between the digital assistant and the user. The digital assistant analyzes segments or portions of the unstructured data input and identifies "burger" as the facet item of an unstructured data input segment. A negative sentiment is identified in the segment, indicating negative sentiment targeted at the facet item of "burger" in this example.

The digital assistant uses identified information, such as the facet item and the targeted sentiment, to craft a response to the input. In this example, the digital assistant may also identify a modifying phrase "too greasy" in the user input, and use the modifying phrase as a pivot to find related words when generating the response. For example, identifying a targeted sentiment that is negative, the digital assistant uses "too greasy" as a pivot to find antonyms, or other words that counter the word "greasy" when generating the response. In this example, the digital assistant selects "more healthy" as a counter phrase or response to the targeted sentiment identified in the user input.

The type of response that the digital assistant generates will depend on the sentiment of the user towards a target facet item. The digital assistant may leverage the specific words used by the user to describe the target item as a pivot to find related words that may be used in crafting the response, given the targeted sentiment.

As another example, if the user says, "I didn't like the chowder, it was too fatty", the digital assistant may identify the facet item (the chowder) and the sentiment targeted at the facet item (negative). The digital assistant may identify the facet item and sentiment using a facet recommender, as described above. The digital assistant may optionally identify a modifying phrase in the segment, such as "too fatty" and may extract the modifying phrase from the segment of user input to use as a pivot to find related words when generating a response. In other words, the digital assistant may generate the response to the unstructured data input based on the identified sentiment, the facet item, and the modifying phrase (if any) extracted from the input. In these examples, given that the facet item has been identified as "the chowder", which may be further identified as a "food" facet using the facet recommender, and that the identified sentiment is negative, the digital assistant may search for a response turn-of-phrase to use that addresses the sentiment and the modifying phrase. For example, "healthier" or "more lean" may be identified as opposites or antonyms of "fatty" and used by the digital assistant to address the negative sentiment targeted at the facet item of the chowder. This turn-of-phrase that addresses both the targeted sentiment and the modifying phrase identified may be incorporated into the generated response using a context free grammar, for example, such as "Next time I will suggest something a bit more lean."

This bit of information—"more lean"—from the generated response based on targeted sentiment identification may also be used to update or refine the user's profile. For example, by adding to the user's profile that they like "lean" things. The original user input may also be used to populate the user's profile, along with the extracted targeted sentiment and facet item, for example, by adding to the user profile that the user does not like "fatty" things or does not like "chowder."

Further information may be added to the user profile by utilizing words in the extracted facet item and/or words associated to the facet item in a knowledge base, for example, by adding to the user profile that the user does not like "creamy" things or "things made with whole milk," in some example scenarios. The digital assistant may use such entries the next time she recommends something, by selecting items that the user profile has noted that the user likes; and by not selecting items that the user profile has noted that the user does not like.

ADDITIONAL EXAMPLES

In some example scenarios, the time of day that the user likes and dislikes things may also be taken into account, such that time of day and other external factors (such as weather) can be used to guide recommendations. For example, outdoor seating should not be recommended when it's raining; meat should not be recommended if the user is a vegetarian.

In some other examples responses may be further crafted based on the words that the user is using as well as other linguistic and non-linguistic features of the user input. For example, by extracting words from the user input, and identifying other words that most closely match, or are most distributionally similar to, the language used by the user when generating a response. This provides a digital assistant that learns to speak like its user, providing responses that align with the user's style of speech.

Alternatively or in addition to the other examples described herein, examples include any combination of the following:

identify a modifying phrase associated with the identified facet item in the segment;

generate the response to the unstructured data input based on the targeted sentiment, the facet item, and the identified modifying phrase;

train a digital assistant to identify targeted sentiment using the unstructured data input;

identify content features of the unstructured data input;

generate the response using one or more of the identified content features to align the response to the unstructured data input;

content features include at least one of linguistic features, non-linguistic features, lexical features, semantic features, or syntactic features;

update a user profile based on the targeted sentiment and the facet item;

identifying a modifying phrase in the segment;

generating the response to the user input based on the identified sentiment and the identified modifying phrase;

identifying other content features of the user input;

generating the response based on one or more of the other identified content features to align the response to the user input;

updating a user profile based on the identified sentiment;

identifying a facet for the facet item;

updating a corresponding facet in a user profile using the facet item and the identified sentiment;

identified sentiment is one of positive, negative, or neutral;

identify a modifying phrase associated with the facet item within the extracted content features;

generate the response to the user input using the modifying phrase as a pivot to identify content features for the response;

generate the response to the user input using content features aligned with the extracted content features of the textual user input;

identify non-linguistic features within the extracted content features;

generate the response to the user input based on one or more of the identified non-linguistic features and the extracted content features to align the response with user input;

generate the response to the user input, the response including at least one content feature associated with the targeted sentiment and a corresponding polarity;

update a user profile based on the targeted sentiment and the facet item;

At least a portion of the functionality of the various elements in FIG. 2 may be performed by other elements in FIG. 1, or an entity (e.g., processor, web service, server, application program, computing device, etc.) not shown in FIG. 1.

In some examples, the operations illustrated in FIG. 3-4 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

In examples involving a general-purpose computer, aspects of the disclosure transform the general-purpose computer into a special-purpose computing device when configured to execute the instructions described herein.

Exemplary Operating Environment

Figure 6:
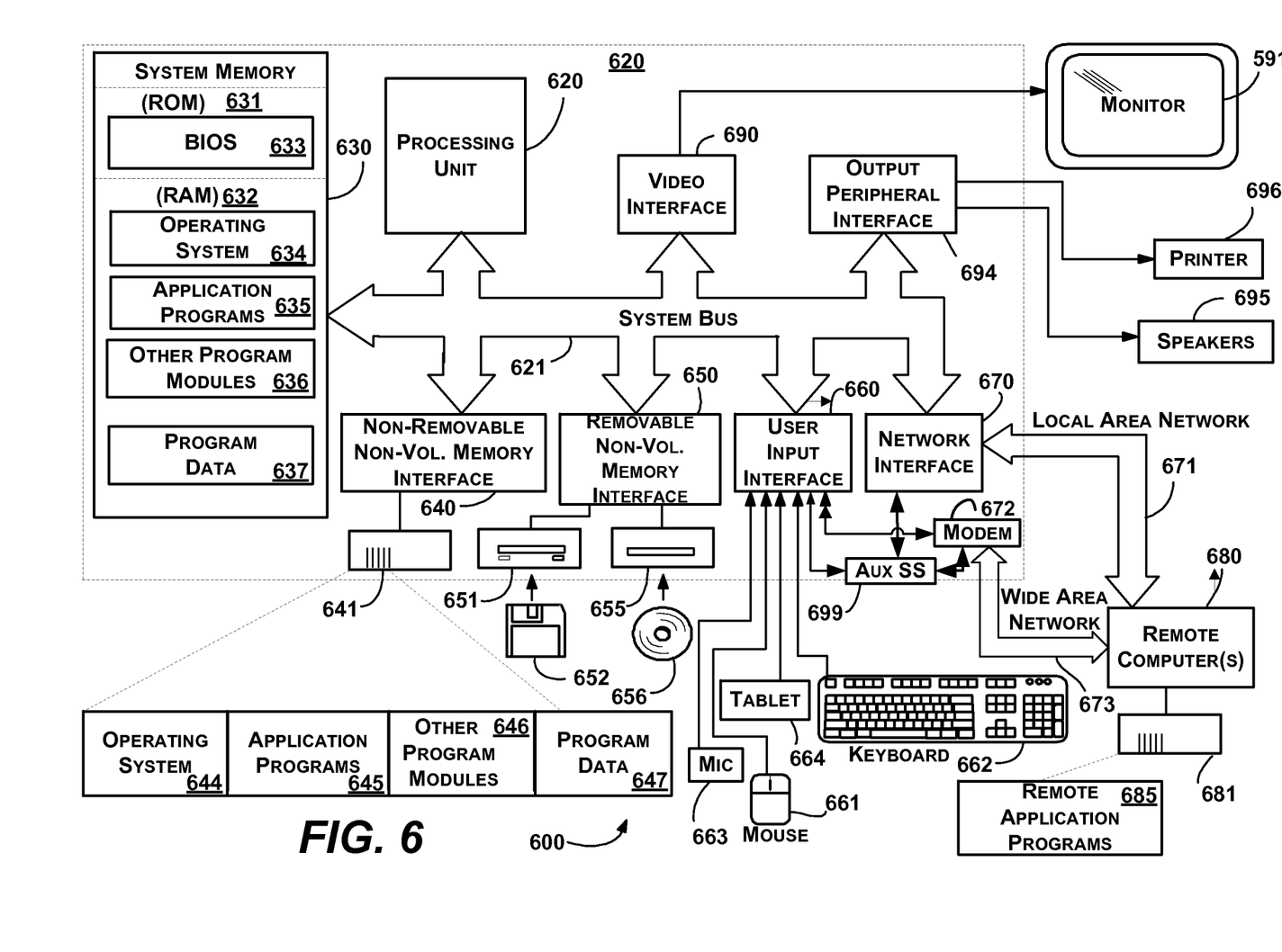
FIG. 6 shows an illustrative example of a computing environment into which various aspects of the present disclosure may be incorporated.

FIG. 6 illustrates an example of a suitable computing and networking environment 600 on which the examples of FIGS. 1-4 may be implemented. The computing system environment 600 is only one example of a suitable computing environment and is not intended to suggest any limitation as to the scope of use or functionality of the disclosure. Neither should the computing environment 600 be interpreted as having any dependency or requirement relating to any one or combination of components illustrated in the exemplary operating environment 600.

The disclosure is operational with numerous other general purpose or special purpose computing system environments or configurations. Examples of well-known computing systems, environments, and/or configurations that may be suitable for use with the disclosure include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the disclosure may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media may be any available media that may be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components may either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel may be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

The examples illustrated and described herein as well as examples not specifically described herein but within the scope of aspects of the disclosure constitute exemplary means for crafting a response based on targeted sentiment identification. For example, the elements illustrated in FIG. 1-2, such as when encoded to perform the operations illustrated in FIG. 3-4, constitute exemplary means for identifying targeted sentiment, exemplary means for classifying the identified sentiment, and exemplary means for generating a response based on the targeted sentiment identified and the facet item at which the targeted sentiment is directed.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for crafting a user specific response based on targeted sentiment identification, said system comprising:
   a memory area associated with a mobile computing device; and
   a processor communicatively coupled to the memory area and configured to:

receive unstructured data input associated with a user;
extract words from the unstructured data, the extracted words including one or more sentiments;
identify the one or more sentiments in the extracted words from the unstructured data input;
identify a facet item in a segment of the unstructured data input by analyzing the extracted words;
identify a sentiment, of the one or more identified sentiments, as being associated with the identified facet item in the segment;
identify a facet associated with the identified facet item in the segment;
classify the identified sentiment as a targeted sentiment directed towards the identified facet item;
identify at least one word that addresses the targeted sentiment directed towards the facet item;
in response to the classification of the targeted sentiment and the identified at least one word, generate the user specific response to the unstructured data input involving the facet, the user specific response incorporating the identified at least one word that addresses the targeted sentiment directed towards the facet item;
output the generated user specific response via a user interface; and
update a user profile based on the facet and the targeted sentiment as being directed towards the facet item.

2. The system of claim 1, wherein the processor is further configured to:
identify a modifying phrase associated with the identified facet item in the segment; and
generate the user specific response to the unstructured data input based on the targeted sentiment, the facet item, and the identified modifying phrase.

3. The system of claim 1, wherein the unstructured data input comprises social media content and wherein the processor is further configured to:
train a digital assistant to identify targeted sentiment using the unstructured data input.

4. The system of claim 1, wherein the processor is further configured to:
identify content features of the unstructured data input; and
generate the user specific response using one or more of the identified content features to align the user specific response to the unstructured data input.

5. The system of claim 4, wherein the content features include at least one of linguistic features, non-linguistic features, lexical features, semantic features, or syntactic features.

6. A method comprising:
receiving user input via a user interface of a computing device;
extracting words from the user input;
identifying, by the processor associated with the computing device, a segment of the extracted words that includes a facet item;
identify a facet associated with the identified facet item in the segment;
identifying a sentiment in the segment based on at least one content feature of the user input, the sentiment directed at the identified facet item, wherein the sentiment is one of a positive, negative, or neutral;
classifying the identified sentiment as a targeted sentiment directed towards the identified facet item;
identifying a modifying phrase including at least one word and associated with the targeted sentiment in the received user input;
using the identified modifying phrase as a pivot to find at least one related word that addresses the targeted sentiment from an activity log associated with the user, wherein the activity log includes at least one of user activity and computing device activity associated with the user;
in response to the classification of the targeted sentiment and the identified modifying phrase and the at least one related word, generating a user input specific response to the received user input, the user input specific response involving the identified facet and incorporating the at least one related word responsive to the targeted sentiment associated with the identified facet item in the received user input, the response including the at least one content feature associated with the targeted sentiment, the identified facet and a corresponding polarity; and
outputting the generated user input specific response via the user interface; and
updating a user profile based on the targeted sentiment and the identified facet item.

7. The method of claim 6, further comprising:
identifying other content features of the user input; and
generating the user input specific response based on one or more of the other identified content features to align the response to the user input.

8. A mobile computing device, the mobile computing device comprising:
a memory area storing a digital assistant; and
a processor configured to execute the digital assistant to:
receive user input via a user interface component of the mobile computing device;
extract words from the user input;
identify a facet item within a segment of the extracted words from the user input at the mobile computing device by analyzing the extracted words;
identify a facet associated with the identified facet item in the segment;
identify a sentiment associated with the identified facet item in the segment;
classify the identified sentiment to identify a targeted sentiment directed towards the identified facet item;
identify a modifying phrase in the extracted words including at least one word and associated with the identified targeted sentiment directed towards the identified facet item in the received user input;
use the identified modifying phrase as a pivot to find at least one related word that addresses the target sentiment;
in response to the classification of the targeted sentiment and the identified modifying phrase and the at least one related word, generate a user input specific response involving the identified facet and incorporating the at least one related word responsive to the targeted sentiment associated with the identified facet item in the received user input at the mobile computing device;
output the generated user input specific response to the user interface component of the mobile computing device; and
update a user profile based on the targeted sentiment and the identified facet.

9. The mobile computing device of claim 8, wherein the processor is further configured to execute the digital assistant to:
extract one or more content features from the received user input.

10. The mobile computing device of claim 9, wherein the processor is further configured to execute the digital assistant to:
generate the user input specific response to the user input using content features aligned with the extracted one or more content features of the user input.

11. The mobile computing device of claim 9, wherein the processor is further configured to execute the digital assistant to:
identify non-linguistic features within the extracted one or more content features; and
generate the user input specific response to the user input based on one or more of the identified non-linguistic features and the extracted one or more content features to align the response with user input.

12. The mobile computing device of claim 9, wherein
the generated user input specific response includes at least one content feature associated with the targeted sentiment and a corresponding polarity.

13. The mobile computing device of claim 8 wherein the identified sentiment is one of positive, negative, or neutral.

14. The system of claim 1, wherein the processor is further configured to classify the identified sentiment as a targeted sentiment directed towards the facet item based on at least one of lexical features, syntactic features, semantic features, linguistic features, or nonlinguistic features.

15. The mobile computing device of claim 8, wherein the processor is further configured to classify the identified sentiment as a targeted sentiment directed towards the facet item based on at least one of lexical features, syntactic features, semantic features, linguistic features, or nonlinguistic features.

16. The method of claim 6, wherein the processor is further configured to classify the identified sentiment as a targeted sentiment directed towards the facet item based on at least one of lexical features, syntactic features, semantic features, linguistic features, or nonlinguistic features.

17. The system of claim 1, wherein the processor is further configured to:
determine whether the identified one or more sentiments are positive, negative, or neutral.

18. The system of claim 1, wherein the processor is further configured to:
generate new conversational utterances about the facet or the facet item based on the targeted sentiment.

19. The system of claim 1, wherein the processor is further configured to:
determine a consensus for the facet using the targeted sentiment; and
generate a new conversational utterance about the facet based on the determined consensus.

20. The mobile computing device of claim 8, wherein the processor is further configured to:
generate new conversational utterances about the identified facet or the identified facet item based on the targeted sentiment.

* * * * *